No. 851,534. PATENTED APR. 23, 1907.
D. C. LEWIS.
STEERING APPLIANCE.
APPLICATION FILED SEPT. 1, 1905.
2 SHEETS—SHEET 1.
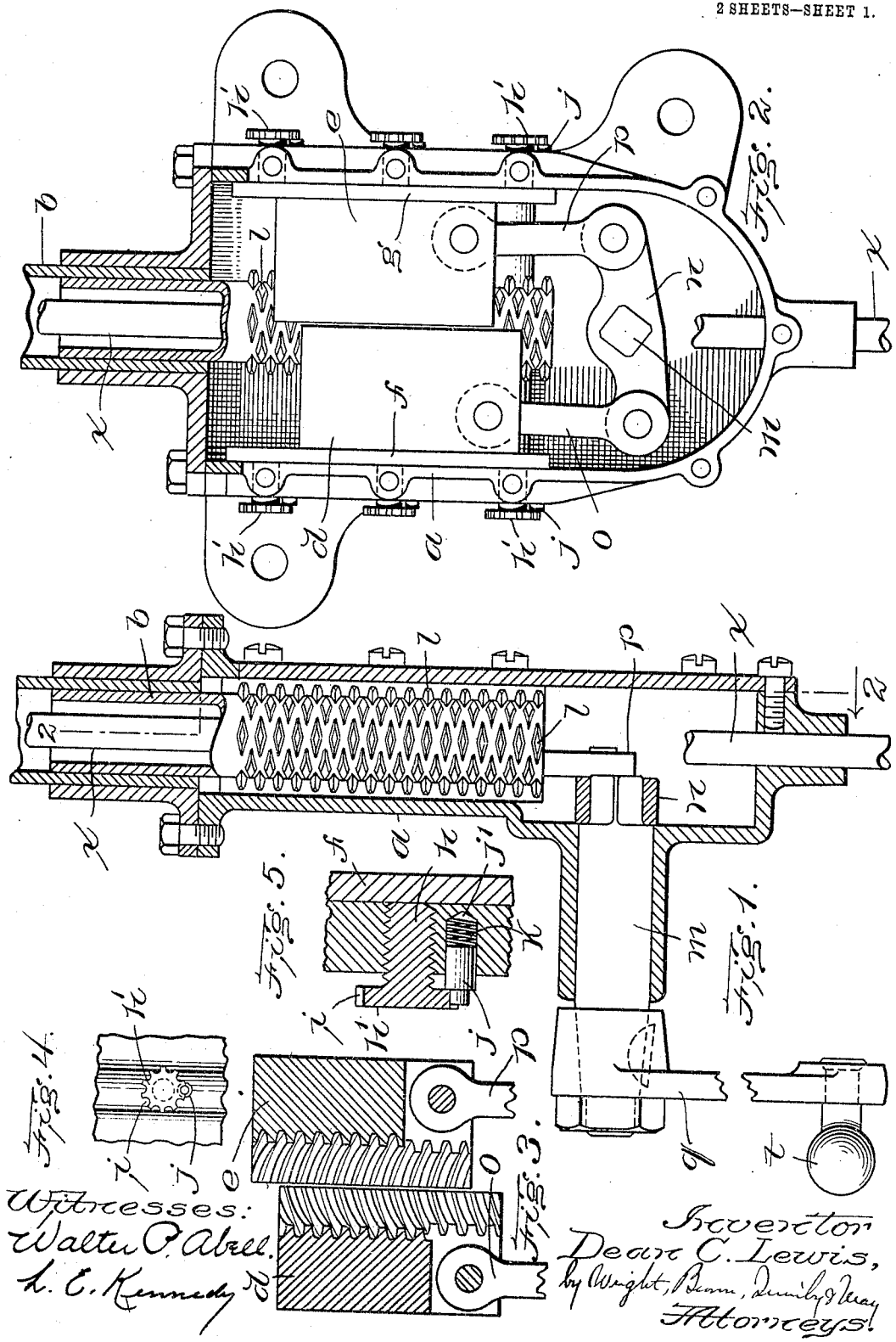

No. 851,534. PATENTED APR. 23, 1907.
D. C. LEWIS.
STEERING APPLIANCE.
APPLICATION FILED SEPT. 1, 1905.
2 SHEETS—SHEET 2.
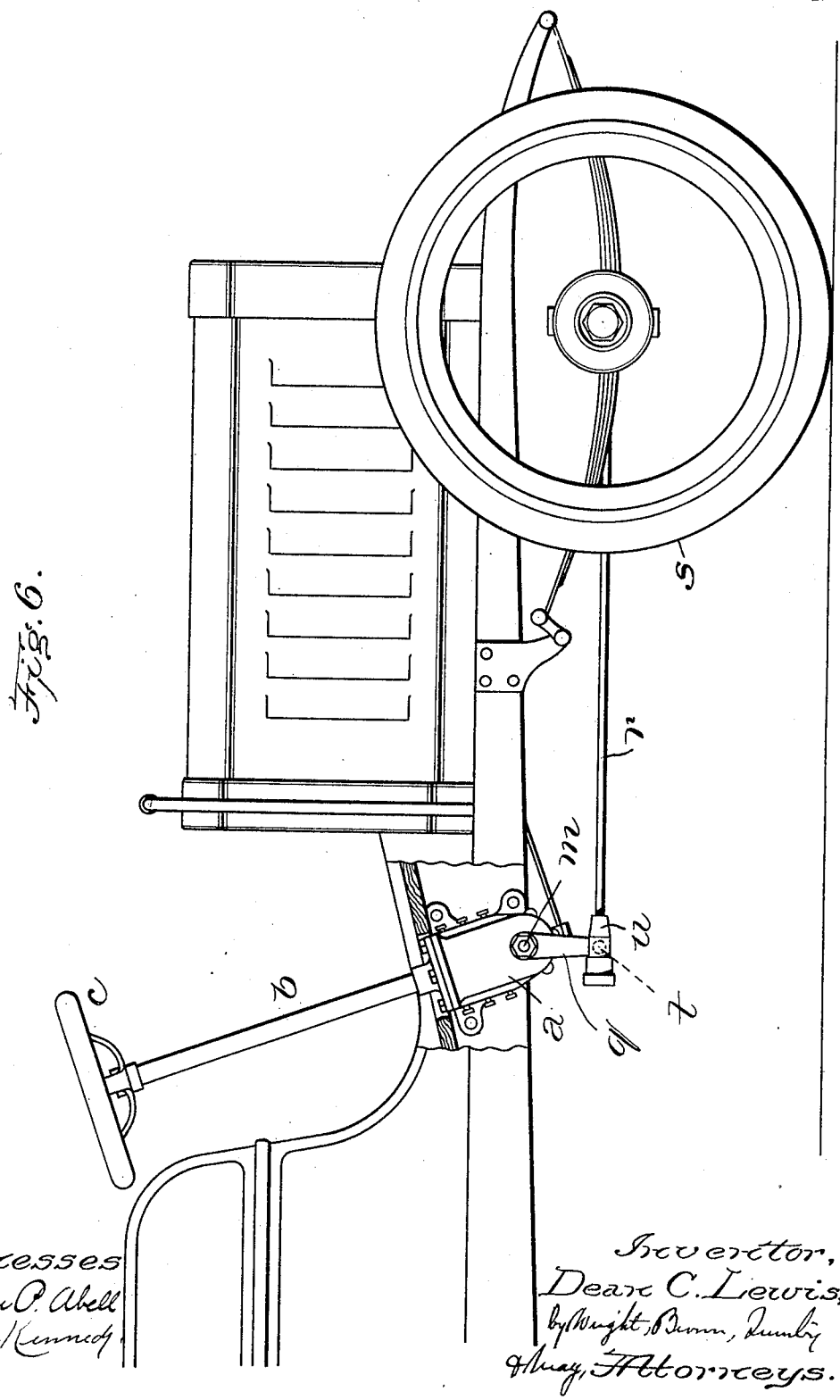

UNITED STATES PATENT OFFICE.

DEAN C. LEWIS, OF PHILADELPHIA, PENNSYLVANIA.

STEERING APPLIANCE.

No. 851,534.　　　　Specification of Letters Patent.　　　Patented April 23, 1907.

Application filed September 1, 1905. Serial No. 276,684.

*To all whom it may concern:*

Be it known that I, DEAN C. LEWIS, of Philadelphia, in the county of Philadelphia and State of Pennsylvania, have invented certain new and useful Improvements in Steering Appliances, of which the following is a specification.

This invention relates to steering appliances and has for its object to provide a mechanism which will be quick in operation and will be at the same time not liable to accidental derangement.

It is particularly adapted for use with motor vehicles, although it may be applied in other relations, and is constructed so that after having once been set by hand, there is no liability of the position of the parts being changed by the resistance of the road or objects striking the steering wheels of the vehicle and intending to move them out of position in which they are set.

The preferred embodiment of the invention is illustrated in the accompanying drawings, in which Figure 1 represents a central section of the device. Fig. 2 represents a sectional elevation taken on line 2—2 of Fig. 1. Fig. 3 is a fragmentary sectional view showing the sliding blocks. Figs. 4 and 5 represent respectively an elevation and a section, one of the adjusting screws used to adjust the guideways of the blocks and of the locking pin therefor. Fig. 6 shows the device as applied to a motor vehicle.

Referring to the drawings, in which like reference characters designate the same parts in all the views, $a$ represents a casing, into which from one end projects a shaft $b$, which extends upwardly and is adapted to have connected upon its end a wheel $c$ or lever, by which it may be operated, the shaft therefore constituting the actuator of the steering device.

The portion of the shaft contained within the casing or housing $a$ is threaded and engages complementary screw threads in sliding blocks $d$ and $e$, which are mounted to slide longitudinally in the casing. In order to give the device the minimum length, these blocks are arranged side by side, and each, instead of wholly surrounding the screw shaft, is formed on the side adjacent the screw with a groove, which receives approximately half the screw, and which is provided with threads engaging with the threads of the screw. These blocks are held in engagement with the screw shaft by gibs or guide-ways mounted at the sides of the casing and adjustable toward and away from the screw shaft by means of adjusting screws $h$, which are threaded through the adjacent walls of the casing and bear at their ends against the sides of the blocks. By means of the screws the guide ways may be pressed with greater or less force against the blocks to hold them with any desired amount of frictional resistance and to prevent looseness in operation.

The screws are provided with heads $h'$, which have notches $i$ in their sides, and adjacent the periphery of each screw head is a pin $j$ set in a socket $j'$ in the casing wall and pressed by a spring $k$ outwardly so as to project into one of the notches. By pressing the pin against the spring it can be disengaged and the screw readily turned.

It is desirable that the blocks $d$ and $e$ should be caused to reciprocate simultaneously in opposite directions when the screw shaft $b$ is turned, and in order to produce this result I provide the blocks with threads extending in different directions, one of them having a right hand and the other a left hand internal thread. The single screw which engages both blocks is provided with a plurality of threads extending in different directions and occupying the same portion of its length one of the threads being a right hand and the other a left hand one, of which one engages the thread of block $d$ and the other the thread of block $e$. The two dissimilar threads of the screw cross each other and produce a number of diamond-shaped projections $l$ which are arranged in helical lines about the screw and into the spaces between which project the correspondingly shaped ribs of the internal threads formed upon the sliding blocks.

It will be evident that different faces of the studs $l$ act upon the different blocks, and thus when the screw is turned, one of the blocks is caused to rise and the other to descend, passing by each other in their movement.

The second shaft $m$ projects into the casing through one of the side walls, and is joined to the slides by connections which permit the motion of these slides to be transmitted to the shaft and to be converted into rotation, such connections consisting of the bar $n$ fixed upon the shaft within the casing and having arms projecting upon each side of the shaft, and links $o$, $p$, pivotally connected to the blocks $d$, $e$, and the respective ends of the bar $n$.

Externally of the casing there is mounted upon the shaft $m$ an arm $q$ having a ball and socket connection with the link $r$, which extends to the laterally shiftable road wheels $s$ of the vehicle, this connection consisting of a stud having the spherical head $t$ held in a socket in a fitting $u$ at the end of the link.

It will be evident from the foregoing that as the screw shaft is rotated, the slide blocks $d$ and $e$ produce equal and opposite stresses upon the bar $n$, causing the shaft $m$ to rotate in one direction and thereby, through the link $r$ and suitable well known connections with the steering road wheels of the vehicle, to swing such wheels laterally to one side or the other. Any external force applied to the wheels $s$ tending to move them out of the position in which they are placed, encounters the resistance of the screw threads against the blocks $d$ and $e$, which absolutely prevent movement of the blocks, and thus danger of the wheels being shifted by other means than the actuator $b$ is eliminated. The screw shaft $b$ may be made hollow, so as to permit the rod $x$ to extend through the same and through the end of the casing, which rod may be connected with the sparking device or the throttle valve of the engine for controlling the same.

It is obvious that other uses may be found for this device besides that above described, as it might readily be applied for steering a boat, in which case the rudder post would take the place of the shaft $m$ and the helm would be connected to the screw shaft $b$.

Various modifications of the device with constructions other than those described may be made without departing from this invention, such as providing a single block instead of a plurality of blocks engaged with the thread and connected to the shaft $m$, or the threads may be formed upon different parts of the screw and the blocks mounted thereon, one above the other.

I claim

1. A steering gear comprising a screw having right and left hand threads, a pair of independent slides arranged on opposite sides of the screw, one having a right hand and the other a left hand internal screw thread engaging the corresponding threads of the screw, adjustable guideways arranged at the opposite sides of said slides from the screw to retain the slides in engagement therewith, a shaft, and connections for communicating motion from the slides to the shaft.

2. A steering gear comprising a screw having a plurality of threads, blocks engaged therewith and adapted to be reciprocated by rotation thereof, a casing enclosing the screw and blocks, and guides or gibs on which the blocks slide adjustably mounted between the blocks and the adjacent sides of the casing.

3. A steering gear comprising a screw having a plurality of threads, blocks engaged therewith, and adapted to be reciprocated by rotation thereof, a casing enclosing the screw and blocks, guides or gibs on which the blocks slide adjustably mounted between the blocks and the adjacent sides of the casing, and adjusting screws threaded into the casing and bearing against said guides.

4. A steering gear comprising a screw having a plurality of threads, blocks engaged therewith and adapted to be reciprocated by rotation thereof, a casing enclosing the screw and blocks, guides or gibs on which the blocks slide adjustably mounted between the blocks and the adjacent sides of the casing, adjusting screws having notched heads threaded through the sides of the casing and bearing against said guides, and locking pins mounted adjacent said screws and arranged to project into the notches in the heads thereof.

5. In combination with a steering gear comprising a casing having bearings in line, a hollow screw shaft in one of said bearings, blocks slidingly mounted in the casing in engagement with said screw, and a steering shaft linked to said blocks for oscillation thereby, an engine-controlling rod passing through the hollow screw shaft and casing, and extending through the alined bearing in the latter.

In testimony whereof I have affixed my signature, in presence of two witnesses.

DEAN C. LEWIS.

Witnesses:
DAVID A. HAMMOND,
JOHN J. SALING.